United States Patent
Wakimoto (10) Patent No.: US 9,796,445 B2
(45) Date of Patent: Oct. 24, 2017

(54) STEERED WHEEL SUSPENSION DEVICE

(71) Applicant: SUZUKI MOTOR CORPORATION, Hamamatsu-shi, Shizuoka (JP)

(72) Inventor: Yojiro Wakimoto, Hamamatsu (JP)

(73) Assignee: SUZUKI MOTOR CORPORATION, Hamamatsu-Shi, Shizuoka (JP)

( * ) Notice: Subject to any disclaimer, the term of this patent is extended or adjusted under 35 U.S.C. 154(b) by 0 days.

(21) Appl. No.: 15/152,955

(22) Filed: May 12, 2016

(65) Prior Publication Data

US 2016/0339982 A1    Nov. 24, 2016

(30) Foreign Application Priority Data

May 21, 2015 (JP) ................. 2015-103802

(51) Int. Cl.
*B62K 21/02* (2006.01)
*B62K 11/04* (2006.01)
*B62K 21/18* (2006.01)

(52) U.S. Cl.
CPC .............. *B62K 21/02* (2013.01); *B62K 11/04* (2013.01); *B62K 21/18* (2013.01)

(58) Field of Classification Search
CPC .................................................... B62K 21/04
See application file for complete search history.

(56) References Cited

U.S. PATENT DOCUMENTS

| 2016/0031520 A1* | 2/2016 | Tomura | B62K 21/20 280/272 |
| 2016/0264210 A1* | 9/2016 | Grobner | B62K 21/04 |

FOREIGN PATENT DOCUMENTS

| EP | 1992555 A1 | 11/2008 | |
| JP | 2007302109 A | * 11/2007 | |
| JP | 2008285050 A | * 11/2008 | B62K 21/18 |

* cited by examiner

*Primary Examiner* — Kevin Hurley
(74) *Attorney, Agent, or Firm* — Troutman Sanders LLP (57) ABSTRACT

A fork bracket of a steered wheel suspension device includes a steering shaft boss portion, a pair of fork clamp portions, and a plate-shaped portion. Into the steering shaft boss portion, a steering shaft is internally inserted on a center in a right-left direction. The pair of the fork clamp portions clamps each of a pair of forks on a position away from the steering shaft boss portion to right and left. The plate-shaped portion couples the steering shaft boss portion to the pair of the fork clamp portions. The plate-shaped portion includes a thick portion on a front end side and a thin portion on a rear end side in an area between the steering shaft boss portion and the pair of the fork clamp portions. The thick portion is disposed from the center to each of the pair of the fork clamp portions.

10 Claims, 10 Drawing Sheets

FIG.6A
CROSS SECTION TAKEN ALONG LINE I - I

FIG.6B
CROSS SECTION TAKEN ALONG LINE II - II

FIG.6C
CROSS SECTION TAKEN ALONG LINE III - III

FIG.7A
CROSS SECTION TAKEN ALONG LINE IV-IV

FIG.7B
CROSS SECTION TAKEN ALONG LINE V-V

STEERED WHEEL SUSPENSION DEVICE

CROSS-REFERENCE TO RELATED APPLICATIONS

This application is based upon and claims the benefit of priority of the prior Japanese Patent Application No. 2015-103802, filed on May 21, 2015, the entire contents of which are incorporated herein by reference.

BACKGROUND OF THE INVENTION

Field of the Invention

The present invention relates to a steered wheel suspension device. For example, the present invention is preferable to be employed for a steered wheel suspension device of a small vehicle such as a motorcycle.

Description of the Related Art

A small vehicle such as a motorcycle employs a steered wheel suspension device to suspend a front wheel as a steered wheel. Such small vehicle turns by largely inclining the vehicle (what is called, by banking). At this time, the front wheel sometimes receives a load in a vehicle-width direction. Then, the steered wheel suspension device is required to absorb the load.

Patent document 1 discloses a front wheel support device for a motorcycle that includes an upper bracket and a lower bracket. The upper bracket and lower bracket includes a cut-out portion that is cut from a rear edge toward the front of the vehicle, and a bottomed or a through lightening portion along a front-rear direction. According to the upper bracket and the lower bracket disclosed in Patent Document 1, the rigidity of the bracket is decreased and the behavior of the vehicle is made gentle when the front wheel receives the load in the vehicle-width direction.

Patent Document 1: Japanese Laid-open Patent Publication No. 2008-285050

However, a fork bracket such as the upper bracket and the lower bracket usually requires the strength and the rigidity to some extent since the fork bracket receives the load when the vehicle is decelerated. On the other hand, as described above, the rigidity is required to be decreased to absorb the load that is received by the fork bracket from a steered wheel while inclining the vehicle. That is, the conflicting requirements are posed on the fork bracket.

Here, in the case where the cut-out portion and similar portion is disposed as Patent Document 1 for example, the cut-out portion is required to have a configuration and a peripheral shape that ensure the strength with respect to a stress concentration applied to the cut-out portion. As a result, this makes the shape of the bracket complicated.

SUMMARY OF THE INVENTION

The present invention has been made to solve the above-described problems. An object of the present invention is to provide a steered wheel suspension device to absorb a load that is received by the fork bracket from a steered wheel while inclining the vehicle even the required strength and rigidity are ensured.

A steered wheel suspension device according to the present invention includes a steering head pipe, a steering shaft, a fork bracket, and a pair of forks. The steering head pipe is disposed on a front side of a vehicle. The steering shaft is inserted into the steering head pipe. The fork bracket is coupled to the steering shaft. The pair of the forks is secured to the fork bracket to support a steered wheel. The fork bracket includes a steering shaft boss portion, a pair of fork clamp portions, and a plate-shaped portion. Into the steering shaft boss portion, the steering shaft is internally inserted on a center in a right-left direction. The pair of the fork clamp portions clamps the respective pair of the forks on a position away from the steering shaft boss portion to right and left. The plate-shaped portion couples the steering shaft boss portion to the pair of the fork clamp portions. The plate-shaped portion includes a thick portion on a front end side and a thin portion on a rear end side in an area between the steering shaft boss portion and the pair of the fork clamp portions. The thick portion is disposed from the center to each of the pair of the fork clamp portions.

DETAILED DESCRIPTION OF THE PREFERRED EMBODIMENTS

The following describes preferred embodiments of a steered wheel suspension device according to the present invention based on the drawings. Here, a description will be given of a case where the steered wheel suspension device is applied to a motorcycle.

Figure 1:
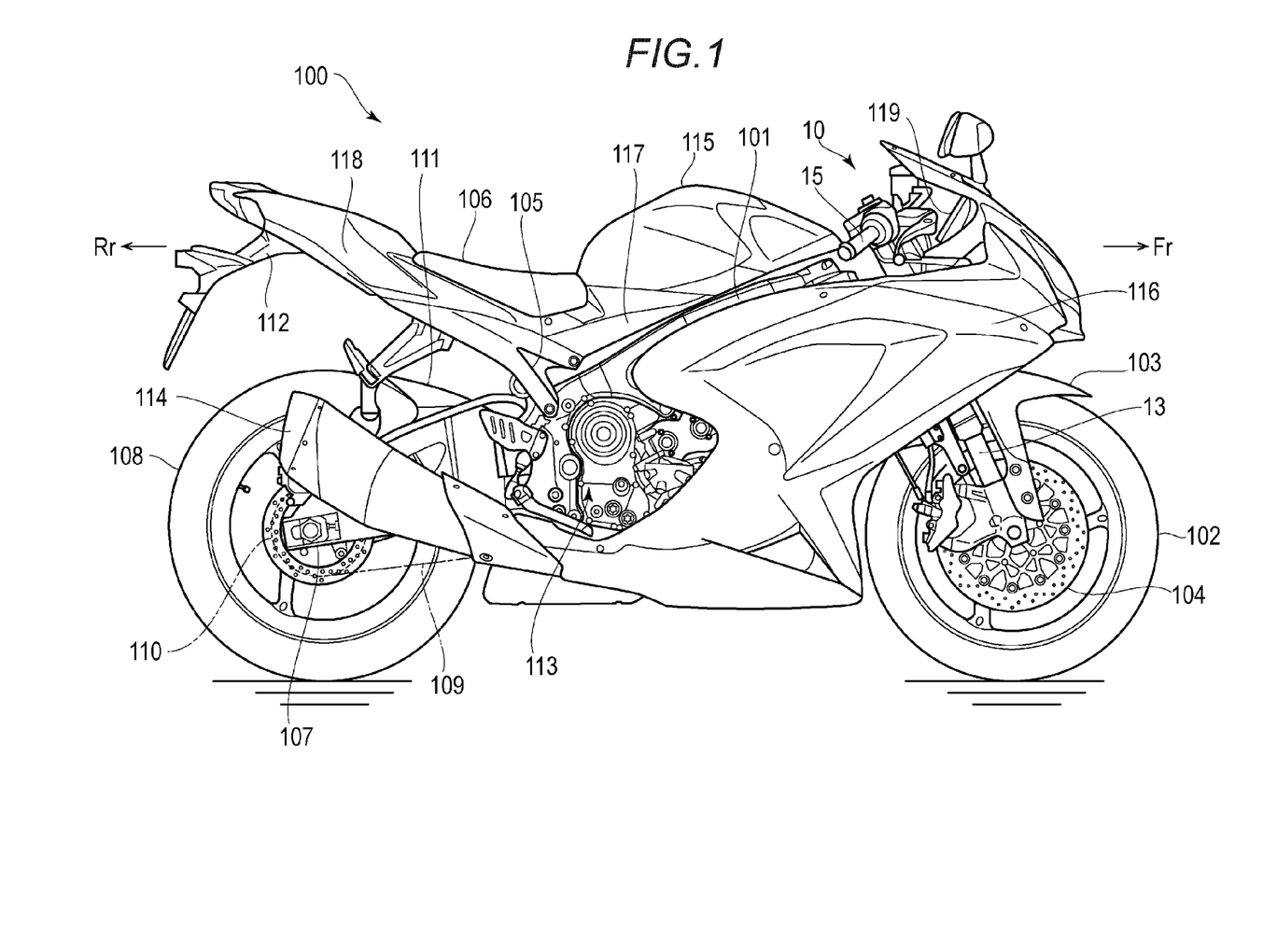
FIG. 1 is a right side view of a motorcycle.

FIG. 1 is a right side view of a motorcycle 100. First, an overall configuration of the motorcycle 100 will be described with reference to FIG. 1. In the following description, in the drawings including FIG. 1, an arrow Fr indicates the front of the vehicle, an arrow Rr indicates the rear of the vehicle, an arrow R indicates the right side of the vehicle, an arrow L indicates the left side of the vehicle, an arrow Up indicates the upper side of the vehicle, and an arrow Lo indicates the lower side of the vehicle, as necessary.

The motorcycle 100 includes a steered wheel suspension device 10 on a front portion of a vehicle body frame 101 (main frame) made of steel or aluminum alloy, for example. The steered wheel suspension device 10 rotatably supports a front wheel 102 as a steered wheel. The front wheel 102 is covered upward with a front fender 103. The front wheel 102 includes a brake disc 104 that integrally rotates with the front wheel 102.

The vehicle body frame 101 is integrally combined to a rear portion of a steering head pipe (described later). The vehicle body frame 101 is branched backward into a fork shape with a pair of right and left, and is disposed to extend backward and obliquely downward from a steering head pipe 11 while widening. In this embodiment, what is called, a twin-spar frame that is used for a vehicle required for a high-speed performance is employed. From near of the rear portion of the vehicle body frame 101, a seat rail 105 extends backward while appropriately inclining backward and obliquely upward. The seat rail 105 supports a seat 106. The vehicle body frame 101 includes a swing arm 107 that is swingably combined to the rear portion of the vehicle body frame 101. The swing arm 107 rotatably supports a rear wheel 108 on the rear end of the swing arm 107. The rear wheel 108 is rotatably driven via a driven sprocket 110 around which a chain 109 to transmit the power of an engine (described later) is wound. The rear wheel 108 is covered obliquely forward and upward with an inner fender ill, and covered obliquely backward and upward with a rear fender 112.

The vehicle body frame 101 mounts an engine 113 to which an air-fuel mixture of air and fuel is supplied. The exhaust gas burned inside the engine 113 passes through an exhaust pipe to be discharged from a muffler 114. The motorcycle 100 includes a fuel tank mounted on the upper side of the engine 113. The fuel tank is covered with a tank cover 115.

In the vehicle exterior, the front portion and the side portion of the vehicle are respectively covered with a front cowl 116 and a side cowl 117. The rear portion and the side portion of the vehicle are covered with a seat cowl 118. The exterior parts such as the front cowl 116, the side cowl 117 and the seat cowl 118 form the appearance form of the vehicle having a streamline shape. The motorcycle 100 includes a meter unit 119 including a speedometer disposed on a position that is forward the steered wheel suspension device 10 and covered with the front cowl 116.

Figure 2:
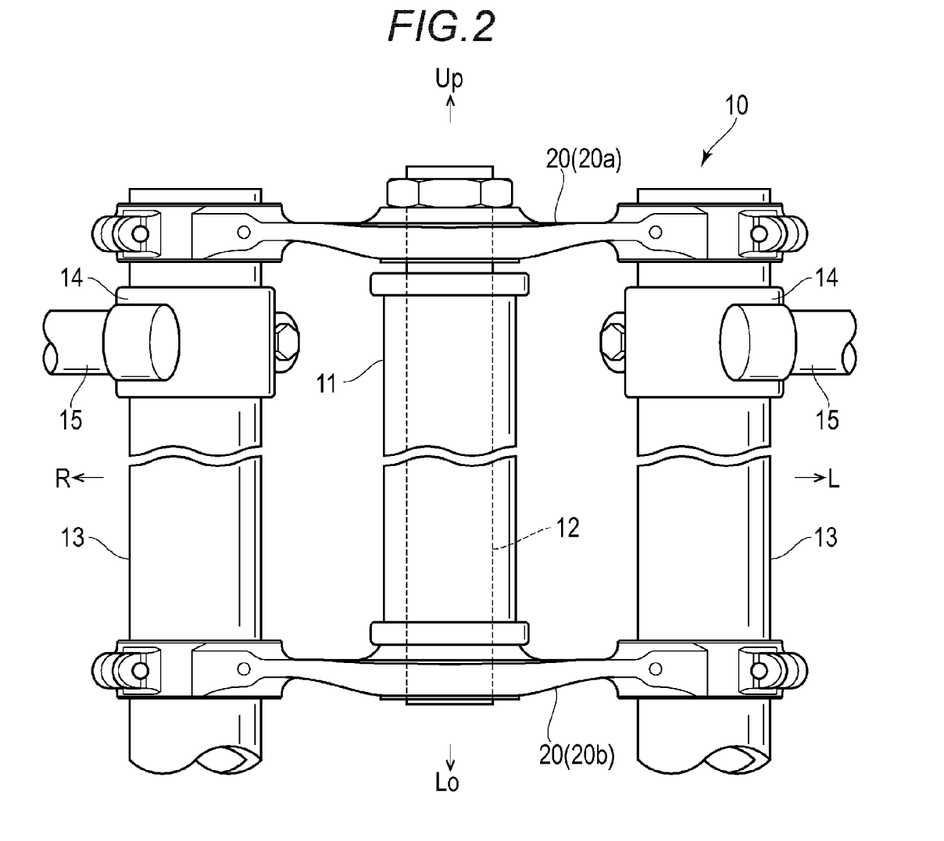
FIG. 2 is a drawing of a steered wheel suspension device viewed from the front side.

FIG. 2 is a drawing of the steered wheel suspension device 10 viewed from the front side. The steered wheel suspension device 10 includes the steering head pipe 11, a steering shaft 12, two fork brackets 20, and a pair of forks 13. The steering head pipe 11 is disposed on the front side of the vehicle, and is coupled to the front portion of the vehicle body frame 101. The steering shaft 12 is inserted into the steering head pipe 11, and is supported turnably around an axis line of the steering head pipe 11. The two fork brackets 20 are disposed upper and lower of the steering head pipe 11, and each of the two fork brackets 20 is coupled to the steering shaft 12. Of the two fork brackets 20, the one disposed upper of the steering head pipe 11 is an upper fork bracket 20a, and the other disposed lower of the steering head pipe 11 is a lower fork bracket 20b. The pair of the forks 13 is secured in a state where each of the pair of the forks 13 is inserted into each of the two fork brackets 20. To each of the pair of the forks 13, a handlebar 15 is combined via a handle bracket 14. The handlebar 15 may be coupled to the fork bracket 20 or the steering shaft 12.

The fork bracket 20 according to the embodiment is configured such that the fork bracket 20 absorbs a load applied from the front wheel 102 while inclining the vehicle even the required rigidity is ensured. The following specifically describes the configuration of the fork bracket 20.

First Embodiment

First, a description will be given of the fork bracket 20 according to the first embodiment with reference to FIG. 3A to FIG. 7B.

Figure 3A:
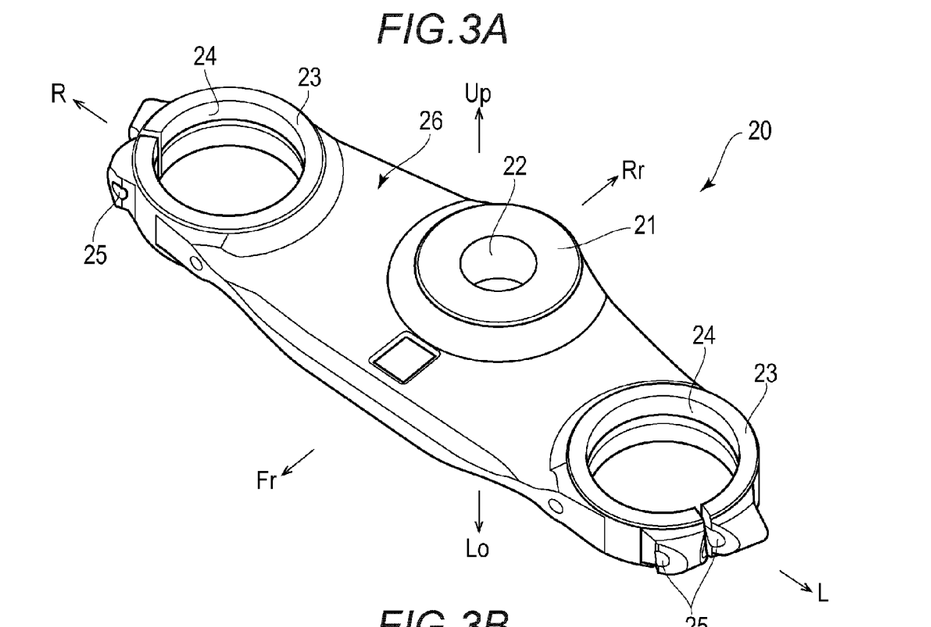
FIG. 3A is a perspective view of a fork bracket according to a first embodiment viewed from the upper side.
Figure 3B:
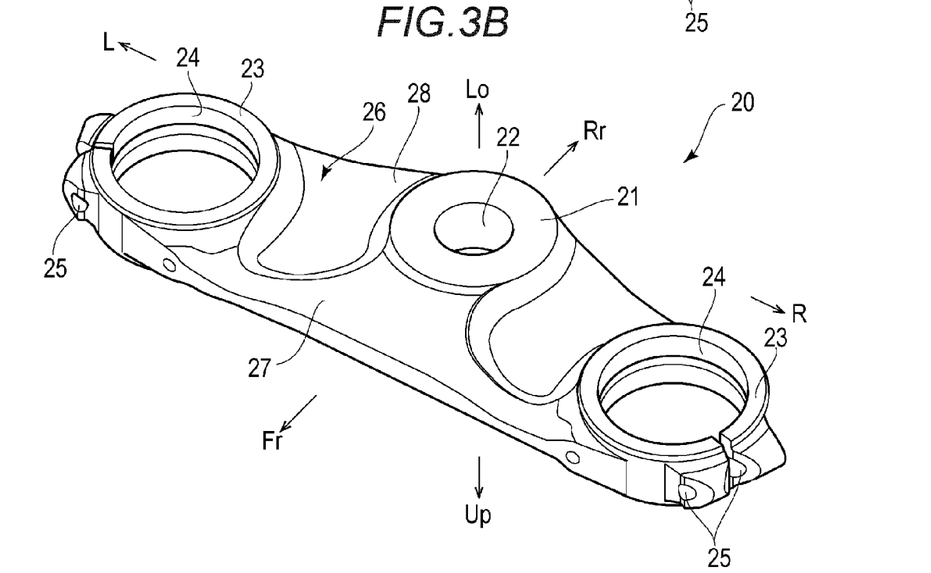
FIG. 3B is a perspective view of the fork bracket according to the first embodiment viewed from the lower side.
Figure 4A:
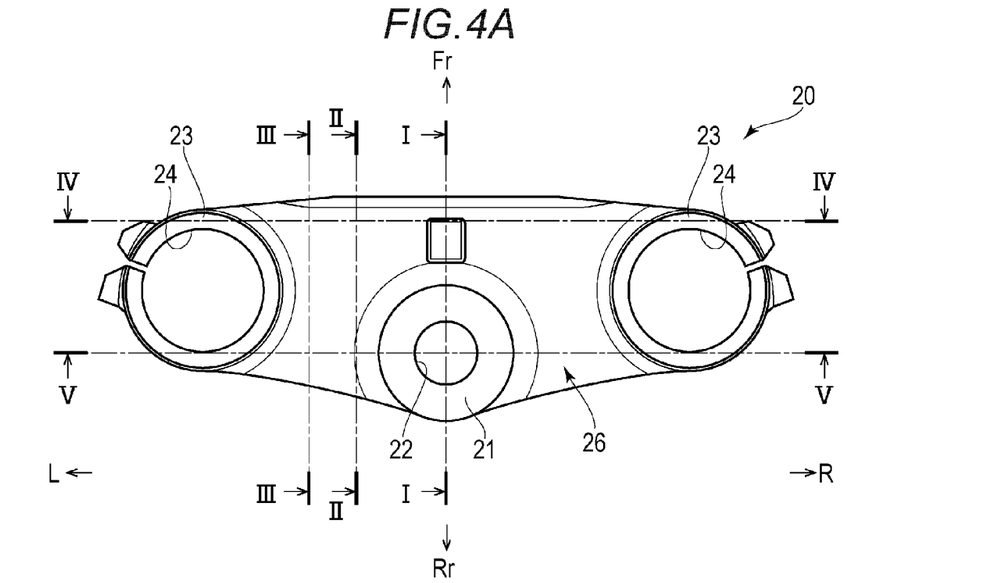
FIG. 4A is a plan view of the fork bracket according to the first embodiment.
Figure 4B:
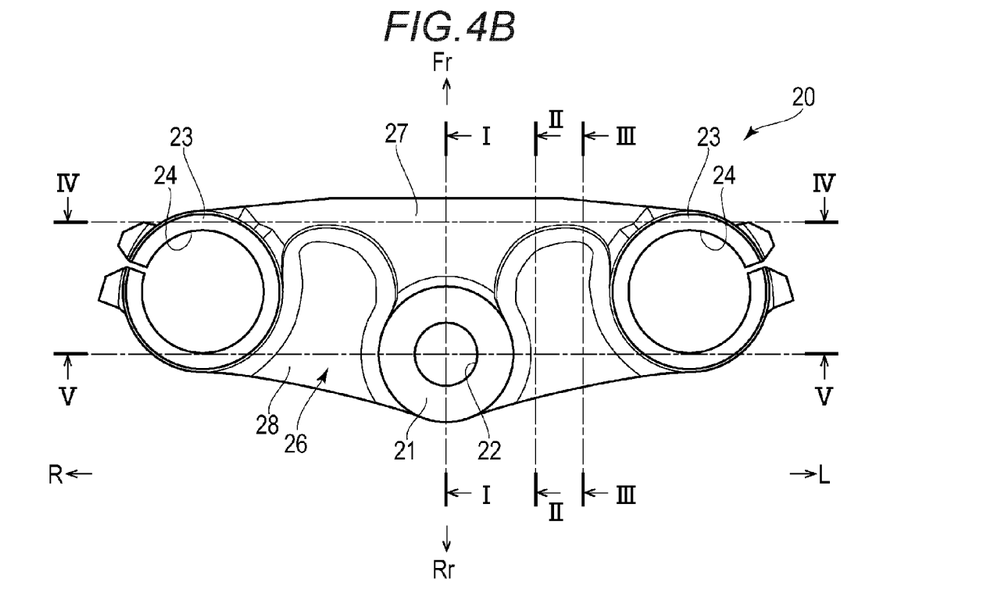
FIG. 4B is a bottom view of the fork bracket according to the first embodiment.
Figure 5:
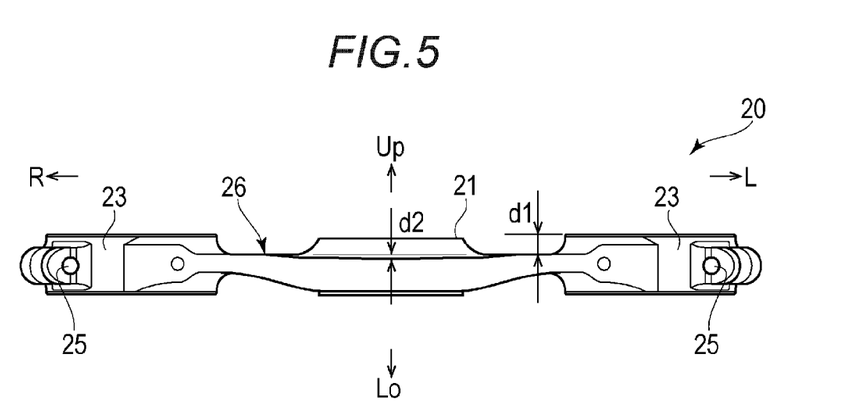
FIG. 5 is a drawing of the fork bracket according to the first embodiment viewed from the front side.
Figure 6A:
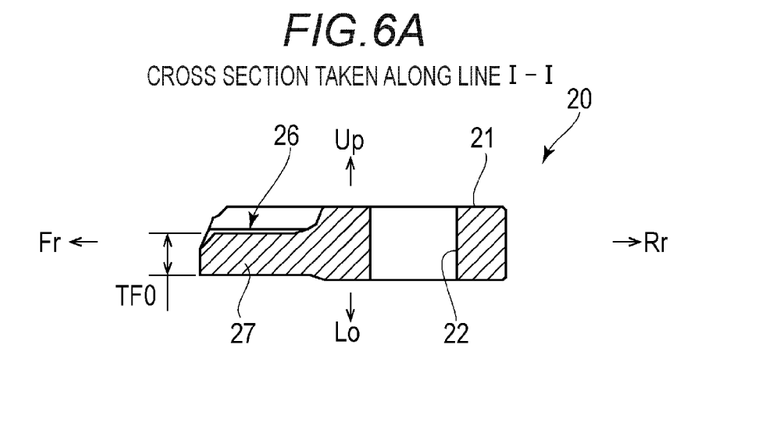
FIG. 6A is a cross-sectional view of the fork bracket according to the first embodiment taken along a line I-I.
Figure 6B:
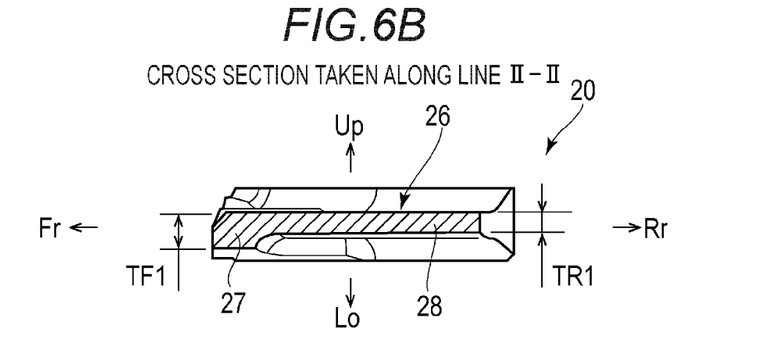
FIG. 6B is a cross-sectional view of the fork bracket according to the first embodiment taken along a line II-II.
Figure 6C:
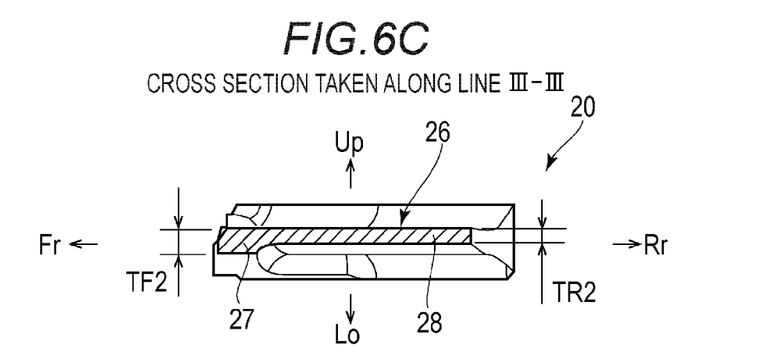
FIG. 6C is a cross-sectional view of the fork bracket according to the first embodiment taken along a line III-III.
Figure 7A:
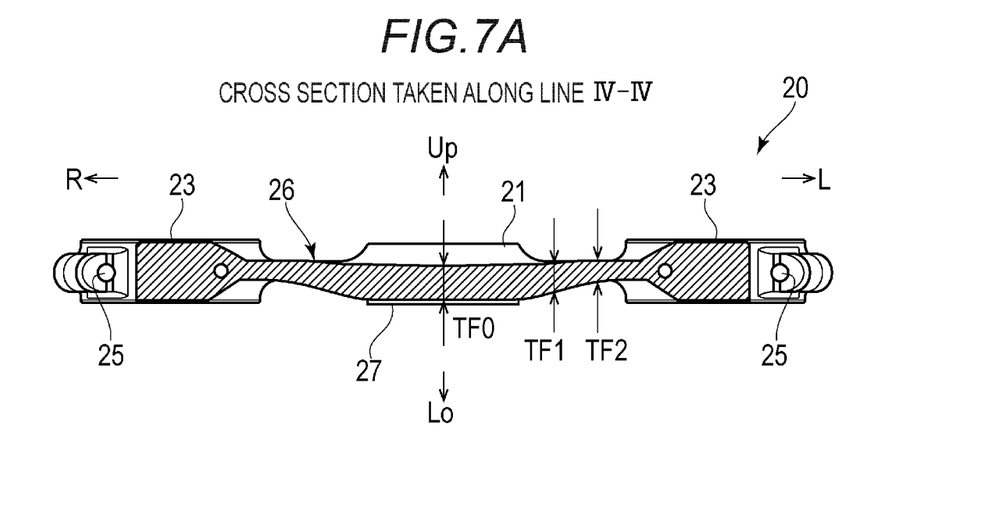
FIG. 7A is a cross-sectional view of the fork bracket according to the first embodiment taken along a line IV-IV.
Figure 7B:
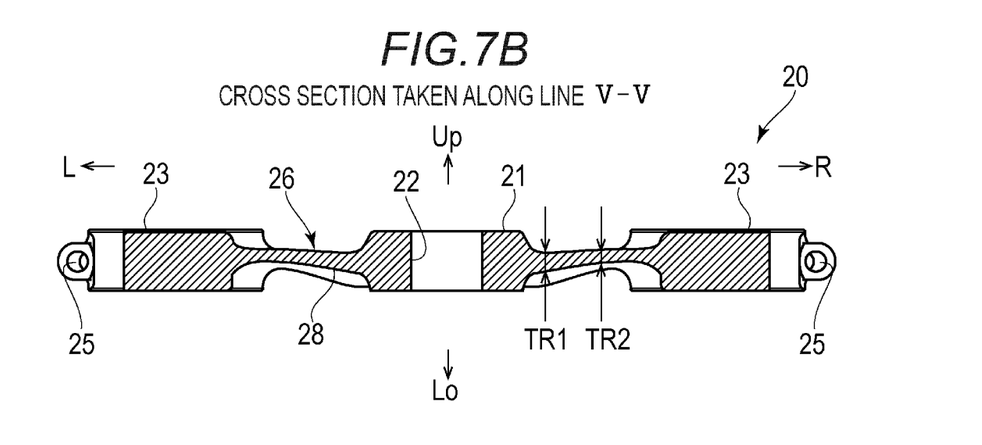
FIG. 7B is a cross-sectional view of the fork bracket according to the first embodiment taken along a line V-V.

FIG. 3A is a perspective view of the fork bracket 20 viewed from the upper side, and FIG. 3B is a perspective view of the fork bracket 20 viewed from the lower side. FIG. 4A is a plan view of the fork bracket 20, and FIG. 4B is a bottom view of the fork bracket 20. FIG. 5 is a drawing of the fork bracket 20 viewed from the front side. FIG. 6A is a cross-sectional view taken along a line I-I illustrated in FIGS. 4A and 4B. FIG. 6B is a cross-sectional view taken along a line II-II illustrated in FIGS. 4A and 4B. FIG. 6C is a cross-sectional view taken along a line III-III illustrated in FIGS. 4A and 4B. FIG. 7A is a cross-sectional view taken along a line IV-IV illustrated in FIGS. 4A and 4B. FIG. 7B is a cross-sectional view taken along a line V-V illustrated in FIGS. 4A and 4B.

The fork bracket 20 according to the first embodiment is mainly used for the upper fork bracket.

The fork bracket 20 is formed in an approximately ellipse shape long in the right-left direction in total. Specifically, the front end of the fork bracket 20 slightly inclines backward from the center in the right-left direction toward right or left. On the other hand, the rear end of the fork bracket 20 slightly inclines forward from the center in the right-left direction toward right or left.

The fork bracket 20 is made of, for example, aluminum alloy, and manufactured by cutting work, or casting and forging using a mold.

The fork bracket 20 mainly includes a steering shaft boss portion 21, a pair of fork clamp portions 23, and a plate-shaped portion 26.

The steering shaft boss portion 21 is disposed on the center of the fork bracket 20 in the right-left direction, and a rear end side in the front-rear direction. The steering shaft boss portion 21 includes an insertion hole 22, into which the steering shaft 12 is internally inserted, drilled in the up-and-down direction. The steering shaft boss portion 21 is disposed to be raised upward so as to receive the load from the steering shaft 12 generated during acceleration and deceleration of the vehicle with a wide surface.

The pair of the fork clamp portions 23 is disposed on the right and left sides of the fork bracket 20. That is, the pair of the fork clamp portion 23 is disposed away from the steering shaft boss portion 21 to right and left. The fork clamp portion 23 includes a clamp hole 24, into which the fork 13 is inserted, along the up-and-down direction. The clamp hole 24 includes a cutout part where a part of the ring-shape is notched. The fork clamp portion 23 includes a fastening hole 25, to which a fixing bolt (not illustrated) is fastened, on the outside across the cutout part. Accordingly, fastening the fixing bolt to the fastening hole 25 in a state where the fork 13 is inserted into the clamp hole 24 can fix the fork 13 to the fork clamp portion 23. The fork clamp portion 23 is formed to be raised upward and downward so as to strongly fix the fork 13 by contacting the fork 13 with a wide surface.

The plate-shaped portion 26 couples the steering shaft boss portion 21 with the pair of the fork clamp portions 23. The plate-shaped portion 26 according to the embodiment varies the thickness corresponding to the part of the plate-shaped portion 26. Namely, while the top surface of the plate-shaped portion 26 is approximately flat as illustrated in FIG. 3A, the inferior surface of the plate-shaped portion 26 is uneven as illustrated in FIG. 3B. Then, the thickness is different corresponding to the part. Specifically, the plate-shaped portion 26 includes a thick portion 27 mainly on the front end side, and a thin portion 28 mainly on the rear end side.

As illustrated in FIG. 3B and FIG. 4B, the thick portion 27 is disposed on the plate-shaped portion 26 from the steering shaft boss portion 21 to the front end. Further, the thick portion 27 is disposed on the front end side of the fork bracket 20 from the center in the right-left direction to the pair of the fork clamp portions 23. Namely, the thick portion 27 is formed in an approximately T-shape in the bottom view.

Conversely, as illustrated in FIG. 3B and FIG. 4B, the thin portion 28 is disposed in the area except the thick portion 27 on the plate-shaped portion 26. Specifically, the thin portion 28 is disposed on the rear end side of the fork bracket 20 and both right and left sides of the steering shaft boss portion 21.

Here, as illustrated in FIG. 6A, in the cross-sectional view of the plate-shaped portion 26 taken along the line I-I in the front-rear direction on the center in the right-left direction, only the thick portion 27 with a thickness TF0 is formed.

FIG. 6B and FIG. 6C are cross-sectional views of the plate-shaped portion 26 taken at the area between the steering shaft boss portion 21 and the fork clamp portion 23 in the front-rear direction.

As illustrated in FIG. 6B, in the cross-sectional view of the plate-shaped portion 26 taken along the line II-II in the front-back direction at the position slightly in the fork clamp portion 23 side from the center, the thick portion 27 with a thickness TF1 and the thin portion 28 with a thickness TR1 are formed on the front end side and the rear end side respectively.

As illustrated in FIG. 6C, in the cross-sectional view of the plate-shaped portion 26 taken along the line III-III in the front-back direction at the position close to the fork clamp portion 23, the thick portion 27 with a thickness TF2 and the thin portion 28 with a thickness TR2 are formed on the front end side and the rear end side respectively.

The thick portion 27 does not have a constant thickness on the entire plate-shaped portion 26, and the thickness is slightly different corresponding to the part. Specifically, as illustrated in the cross-sectional view taken along the line IV-IV in FIG. 7A, the thick portion 27 gradually decreases in thickness from the center in the right-left direction toward each of the pair of the fork clamp portions 23. Here, FIG. 7A indicates the thicknesses TF0, TF1, and TF2 of the thick portion 27 that are thicknesses on identical positions to the cut-off positions indicated in FIG. 6A to FIG. 6C. Namely, the thick portion 27 has the thickness TF0 on the center, and has the thickness TF1 and the thickness TF2 toward the fork clamp portion 23. In this case, the relation is indicated as TF0>TF1>TF2.

The thin portion 28 also does not have a constant thickness on the entire plate-shaped portion 26, and the thickness is slightly different corresponding to the part. Specifically, as illustrated in the cross-sectional view taken along the line V-V in FIG. 7B, the thin portion 28 gradually decreases in thickness from the center side in the right-left direction toward each of the pair of the fork clamp portions 23. Here, FIG. 7B indicates the thicknesses TR1 and TR2 of the thin portion 28 that are thicknesses on identical positions to the cut-off positions indicated in FIG. 6B and FIG. 6C. Namely, the thin portion 28 has the thickness TR1 on the center side, and has the thickness TR2 on the side close to the fork clamp portion 23. In this case, the relation is indicated as TR1>TR2.

Next, a description will be given of the top surface of the fork bracket 20 as illustrated in FIG. 3A.

The fork bracket 20 is formed such that the top surface of the part, which is coupled to the pair of the fork clamp portions 23, of the plate-shaped portion 26 is depressed with respect to the top surface of the fork clamp portion 23. Specifically, as illustrated in FIG. 5, the top surface of the plate-shaped portion 26 coupled to the fork clamp portion 23 is formed to be depressed with respect to the top surface of the fork clamp portion 23 by approximately a height d1.

Further, as illustrated in FIG. 5, the top surface of the plate-shaped portion 26 on the center in the right-left direction is formed to be depressed with respect to the top surface of the fork clamp portion 23 by further approximately a height d2 in addition to the height d1.

Accordingly, the top surface of the plate-shaped portion 26 is formed to be warped so as to be gradually upward from the center in the right-left direction toward the pair of the fork clamp portions 23.

Thus, according to the fork bracket 20 of the embodiment, the plate-shaped portion 26 of the fork clamp portion 23 includes the thick portion 27 on the front end side. This ensures the required rigidity with respect to the load applied to the front end side of the fork clamp portion 23 during deceleration. On the other hand, the plate-shaped portion 26 of the fork clamp portion 23 includes the thin portion 28 on the rear end side to appropriately decrease the rigidity in the vehicle width direction. This ensures the load applied from the front wheel 102 while inclining the vehicle to be absorbed. Accordingly, even when the vehicle is inclined, the steering stability of the vehicle can be improved. Disposing the thin portion 28 realizes the weight reduction of the fork bracket 20.

The fork bracket 20 of the embodiment requires no cut-out portion or hole for decreasing the rigidity. This ensures the uniformity of the shape, and provides the excellent steering stability and appearance. The fork bracket 20 of the embodiment can be simplified in the shape since the fork bracket 20 requires no cut-out portion or hole. Accordingly, in the case where the mold is used for manufacturing the fork bracket 20, the fork bracket 20 can be easily shaped.

Assume a mass production vehicle where the fork bracket 20 includes equipment such as a key cylinder. Conventionally, in the case where the fork bracket includes the cut-out portion or the hole for decreasing the rigidity, the key cylinder is required to be mounted on the position avoiding the cut-out portion and the hole from the aspect of the security. This limits the position of the mounting portion. On the other hand, in the fork bracket 20 of the embodiment, since the cut-out portion and the hole are not disposed, the position of the mounting portion to mount the key cylinder on the fork bracket 20 can be freely set. If the mounting portion of the key cylinder is attempted to break, the fork bracket 20 of the embodiment has the fracture resistance since the cut-out portion and the hole are not disposed.

The thick portion 27 and the thin portion 28 of the plate-shaped portion 26 of the embodiment are configured to gradually decrease in thickness from the center in the right-left direction toward each of the pair of the fork clamp portions 23. This ensures the rigidity on the center of the plate-shaped portion 26, and makes each side of the pair of the fork clamp portions 23 to be easily deflected to absorb the load.

The plate-shaped portion 26 of the embodiment is configured such that the top surfaces of the parts coupled to the pair of the fork clamp portions 23 are depressed with respect to the top surfaces of the pair of the fork clamp portions 23. This makes the part of the plate-shaped portion 26 coupled to the fork clamp portion 23 to be approximately deflected easily to absorb the load when the fork 13 receives the load obliquely upward from the front wheel 102.

The plate-shaped portion 26 of the embodiment is configured such that the top surface of the center in the right-left direction is depressed with respect to the top surface of the fork clamp portion 23. This improves the visibility and the degree of freedom for layout of the meter unit 119 disposed on the front side of the steered wheel suspension device 10, specifically, on the front side of the fork bracket 20. The configuration of the plate-shaped portion 26 also improves the degree of freedom for shape of the front cowl 116 that covers the meter unit 119.

The plate-shaped portion 26 of the embodiment is configured to such that the top surface is warped to be gradually upward from the center in the right-left direction toward the pair of the fork clamp portions 23. Thus, forming the plate-shaped portion 26 warped not perfectly flat makes the plate-shaped portion 26 to be approximately deflected easily to absorb the load.

Second Embodiment

Figure 8A:
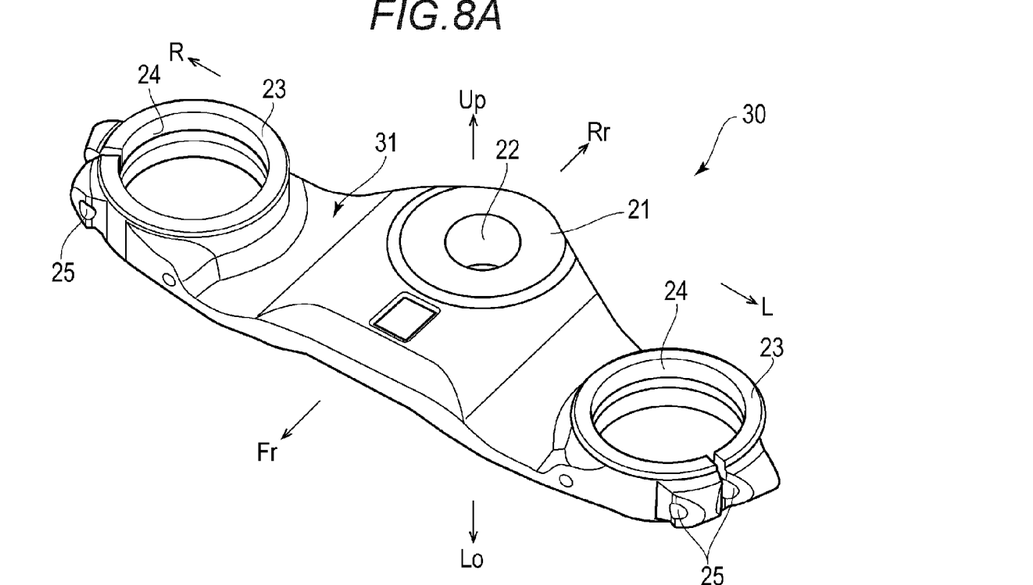
FIG. 8A is a perspective view of a fork bracket according to a second embodiment viewed from the upper side.
Figure 8B:
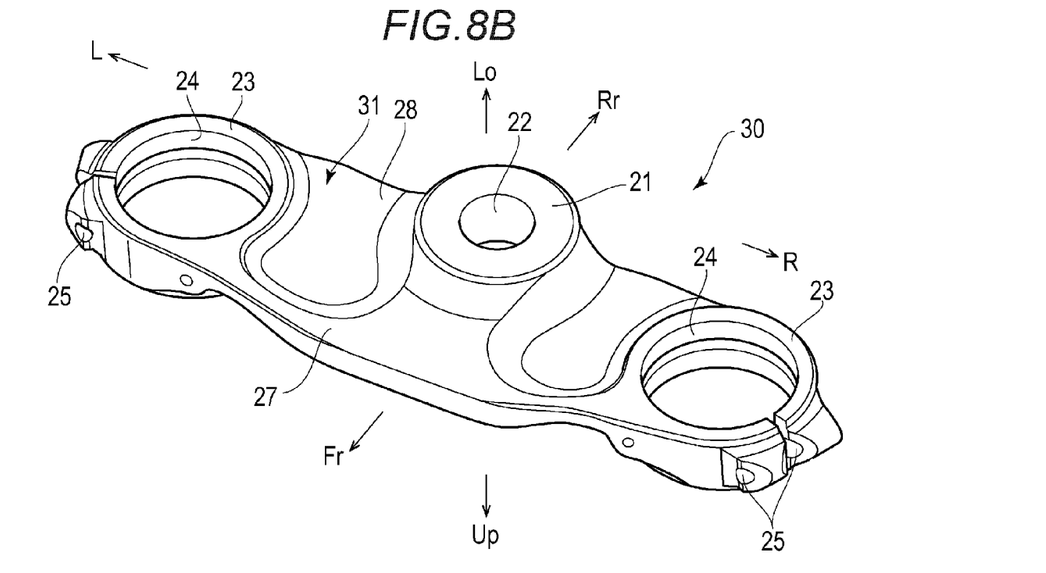
FIG. 8B is a perspective view of the fork bracket according to the second embodiment viewed from the lower side.
Figure 9A:
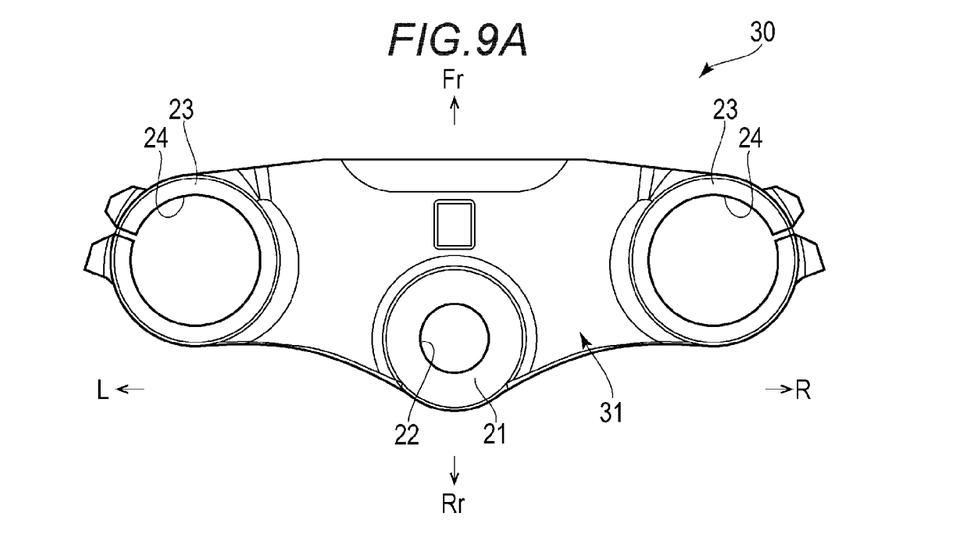
FIG. 9A is a plan view of the fork bracket according to the second embodiment.
Figure 9B:
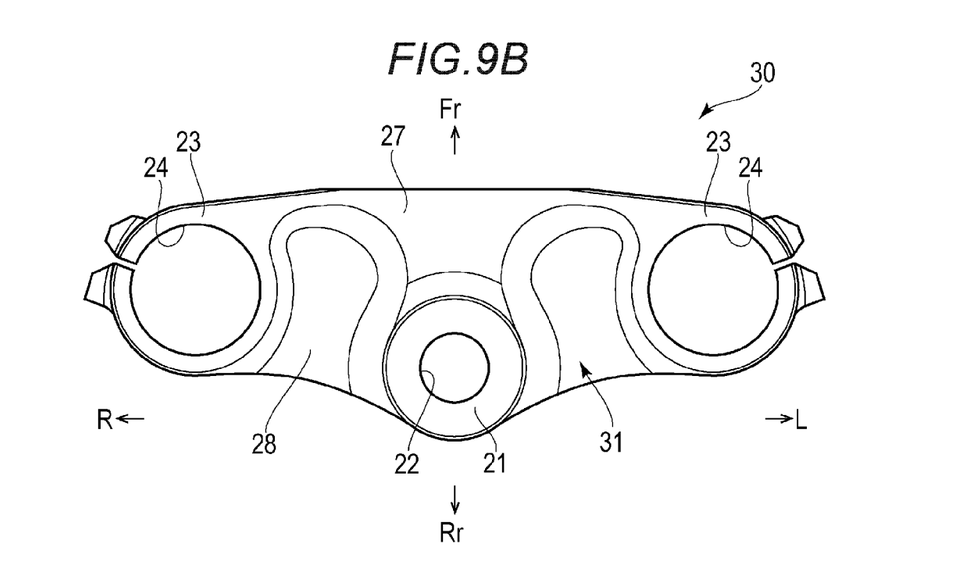
FIG. 9B is a bottom view of the fork bracket according to the second embodiment
Figure 10:
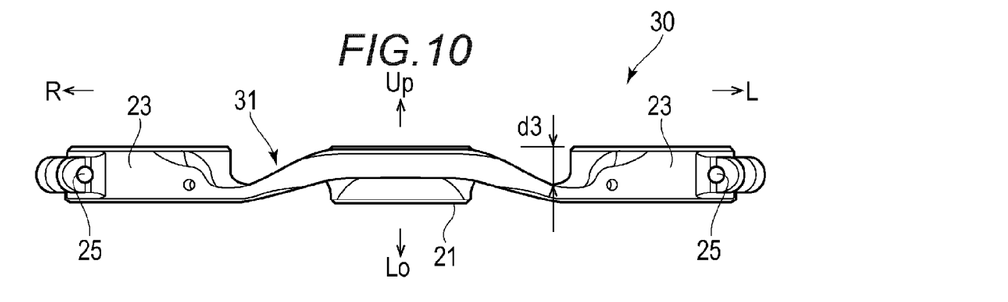
FIG. 10 is a drawing of the fork bracket according to the second embodiment viewed from the front side.

Next, a description will be given of a fork bracket 30 according to a second embodiment with reference to FIG. 8A to FIG. 10. FIG. 8A is a perspective view of the fork bracket 30 viewed from the upper side, and FIG. 8B is a perspective view of the fork bracket 30 viewed from the lower side. FIG. 9A is a plan view of the fork bracket 30, and FIG. 9B is a bottom view of the fork bracket 30. FIG. 10 is a drawing of the fork bracket 30 viewed from the front side.

The fork bracket 30 according to the second embodiment is mainly used for the upper fork bracket. Here, the difference from the first embodiment will be described mainly, and like reference numerals designate corresponding or identical elements.

The fork bracket 30 is configured such that a steering shaft boss portion 21 is disposed to be raised downward, and a fork clamp portion 23 is disposed to be raised upward.

A plate-shaped portion 31 includes a thick portion 27 mainly on the front end side, and a thin portion 28 mainly on the rear end side.

As illustrated in FIG. 8B and FIG. 9B, the thick portion 27 is disposed from the steering shaft boss portion 21 to the front end of the plate-shaped portion 31. Further, the thick portion 27 is disposed on the front end side of the fork bracket 30 from the center in the right-left direction to the pair of the fork clamp portion 23. Namely, the thick portion 27 is formed in an approximately T-shape in the bottom view. The thick portion 27 gradually decreases in thickness from the center in the right-left direction toward each of the pair of the fork clamp portions 23.

As illustrated in FIG. 8B and FIG. 9B, the thin portion 28 is disposed on the rear end side of the fork bracket 30 and both right and left sides of the steering shaft boss portion 21. The thin portion 28 gradually decreases in thickness from the center side in the right-left direction toward each of the pair of the fork clamp portions 23.

Next, a description will be given of the top surface of the fork bracket 30.

The fork bracket 30 is formed such that the top surface of the part, which is coupled to the pair of the fork clamp portions 23, of the plate-shaped portion 31 is depressed with respect to the top surface of the fork clamp portion 23. Specifically, as illustrated in FIG. 10, the top surface of the plate-shaped portion 31 coupled to the fork clamp portion 23 is formed to be depressed with respect to the top surface of the fork clamp portion 23 by approximately a height d3.

The plate-shaped portion 31 of the embodiment warps in a direction different from the direction in which the plate-shaped portion 26 of the first embodiment warps. Namely, the plate-shaped portion 31 of the embodiment is formed such that the top surface is warped to be gradually downward from the center in the right-left direction toward the pair of the fork clamp portions 23. Thus, forming the plate-shaped portion 31 warped not perfectly flat makes the plate-shaped portion 31 to be appropriately deflected easily to absorb the load. The plate-shaped portion 31 can be formed such that the top surface of the part coupled to the pair of the fork clamp portions 23 is more depressed with respect to the top surface of the pair of the fork clamp portion 23. This makes the part of the plate-shaped portion 31 coupled to the fork clamp portion 23 to be deflected more easily to absorb the load more.

Third Embodiment

Figure 11A:
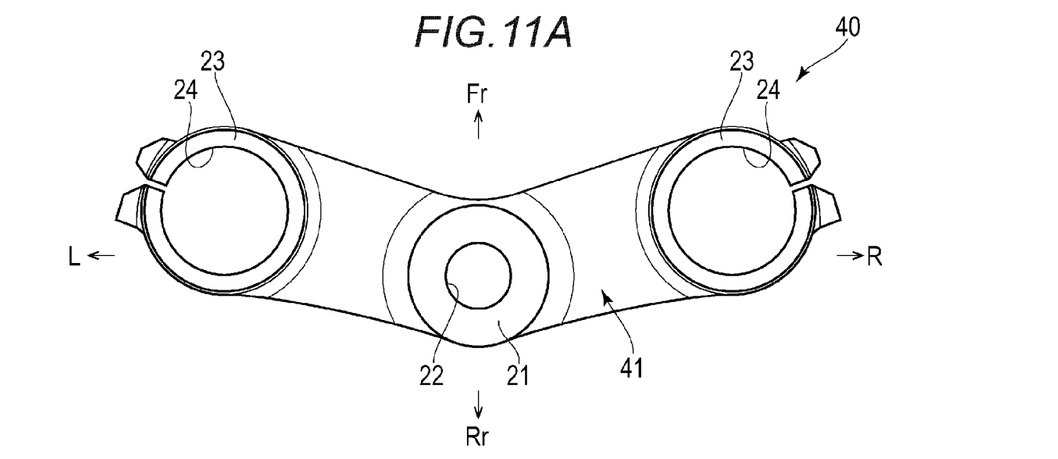
FIG. 11A is a plan view of a fork bracket according to a third embodiment.
Figure 11B:
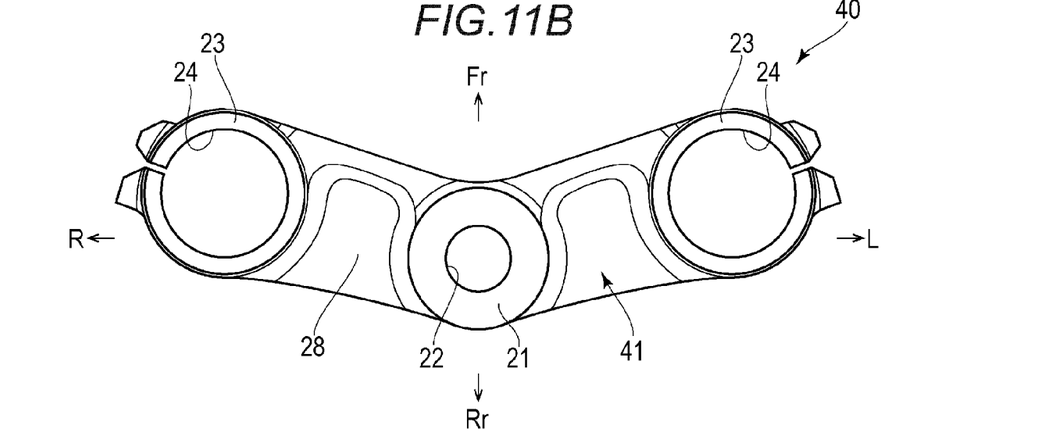
FIG. 11B is a bottom view of the fork bracket according to the third embodiment.

Next, a description will be given of a fork bracket 40 according to a third embodiment with reference to FIG. 11A and FIG. 11B. FIG. 11A is a plan view of the fork bracket 40, and FIG. 11B is a bottom view of the fork bracket 40.

The fork bracket 40 according to the third embodiment is mainly used for the lower fork bracket. Here, the difference from the first embodiment will be described mainly, and like reference numerals designate corresponding or identical elements.

The fork bracket 40 is formed in an approximately boomerang shape long in the right-left direction in total. Namely, the front end of a plate-shaped portion 41 inclines forward from the center in the right-left direction toward each of a pair of fork clamp portions 23 in the plan view. In other words, the front end of the plate-shaped portion 41 is formed in a curved shape so as to dent the front end of the plate-shaped portion 26 of the first embodiment toward a steering shaft boss portion 21.

The fork bracket 40 is configured such that the steering shaft boss portion 21 is disposed to be raised upward, and the fork clamp portion 23 is disposed to be raised upward and downward.

The plate-shaped portion 41 includes a thick portion 27 mainly on the front end side, and a thin portion 28 mainly on the rear end side.

As illustrated in FIG. 11B, the thick portion 27 is disposed on the front end side of the fork bracket 20 from the center in the right-left direction to the pair of the fork clamp portions 23.

The thin portion 28 is disposed on the rear end side of the fork bracket 20 and both right and left side of the steering shaft boss portion 21.

Thus, forming the front end of the plate-shaped portion 41 in a curved shape toward the steering shaft boss portion 21 reduces the weight of the fork bracket 40. The change in the thickness of the thick portion 27 and the thin portion 28, and similar factor are otherwise similar to the fork bracket 20 according to the first embodiment. The front end of the fork bracket 30 according to the second embodiment may be formed in a curved shape toward the steering shaft boss portion 21.

While the preferred embodiments of the present invention have been described, the present invention is not limited only to the above-described embodiments. Changes and similar modification are possible within the scope of the present invention. For example, the shapes described in the above embodiments can be combined as necessary.

For example, while the case where the steered wheel suspension device 10 is applied to the motorcycle 100 is described in the embodiment, not limiting to the case, the steered wheel suspension device 10 can be applied to a small vehicle such as a motor tricycle.

For example, while the steered wheel suspension device 10 where the fork bracket 20 is disposed upper and lower of the steering head pipe 11 is described in the embodiment, not limiting to the case, the steered wheel suspension device 10 may be configured with only one fork bracket 20.

With the steered wheel suspension device according to the present invention, the required rigidity is ensured, and the load applied from the steered wheel can be absorbed while inclining the vehicle.

What is claimed is:

1. A steered wheel suspension device, comprising:
   a steering head pipe disposed on a front side of a vehicle;
   a steering shaft inserted into the steering head pipe;
   a fork bracket coupled to the steering shaft; and
   a pair of forks secured to the fork bracket to support a steered wheel, wherein the fork bracket includes:
      a steering shaft boss portion into which the steering shaft is internally inserted on a center in a right-left direction;
      a pair of fork clamp portions that clamps the respective pair of the forks on positions away from the steering shaft boss portion to right and left; and
      a plate-shaped portion that couples the steering shaft boss portion to the pair of the fork clamp portions, wherein
   the plate-shaped portion includes a thick portion on a front end side and a thin portion on a rear end side in an area between the steering shaft boss portion and the pair of the fork clamp portions, and
   the thick portion is disposed from the center to each of the pair of the fork clamp portions.

2. The steered wheel suspension device according to claim 1, wherein
   the thick portion is disposed to gradually decrease in thickness from the center toward the pair of the fork clamp portions.

3. The steered wheel suspension device according to claim 1, wherein
   the thin portion is disposed to gradually decrease in thickness from the center toward the pair of the fork clamp portions.

4. The steered wheel suspension device according to claim 1, wherein
   the plate-shaped portion is disposed to have a part coupled to the pair of the fork clamp portions, and a top surface of the part is depressed with respect to a top surface of the pair of the fork clamp portions.

5. The steered wheel suspension device according to claim 1, wherein
   the plate-shaped portion is disposed to have a top surface of the center that is depressed with respect to the top surface of the fork clamp portion.

6. The steered wheel suspension device according to claim 1, wherein
   the plate-shaped portion is disposed to have a top surface warped upward from the center toward the pair of the fork clamp portions.

7. The steered wheel suspension device according to claim 1, wherein
   the plate-shaped portion is disposed to have a top surface warped downward from the center toward the pair of the fork clamp portions.

8. The steered wheel suspension device according to claim 1, wherein
   the thick portion is disposed from the steering shaft boss portion to a front end of the plate-shaped portion.

9. The steered wheel suspension device according to claim 1, wherein
   the front end of the plate-shaped portion inclines forward from the center toward the pair of the fork clamp portions in a plan view.

10. The steered wheel suspension device according to claim 1, wherein the thin portion reaches a rear end of the plate-shaped portion the thick portion and the thin portion continue via step between the thin portion and the thin portion without passing other step.

\* \* \* \* \*